United States Patent
Farhadiroushan et al.

(10) Patent No.: US 9,541,426 B2
(45) Date of Patent: Jan. 10, 2017

(54) OPTICAL SENSOR AND METHOD OF USE

(71) Applicant: Silixa Ltd., Elstree, Hertfordshire (GB)

(72) Inventors: Mahmoud Farhadiroushan, Elstree Hertfordshire (GB); Tom Richard Parker, Elstree Hertfordshire (GB); Sergey Shatalin, Elstree Hertfordshire (GB)

(73) Assignee: Silica Limited, London (GB)

( * ) Notice: Subject to any disclaimer, the term of this patent is extended or adjusted under 35 U.S.C. 154(b) by 0 days.

(21) Appl. No.: 14/662,940

(22) Filed: Mar. 19, 2015

(65) Prior Publication Data
US 2015/0192436 A1 Jul. 9, 2015

Related U.S. Application Data

(63) Continuation of application No. 13/322,448, filed as application No. PCT/GB2010/050888 on May 27, 2010, now Pat. No. 9,140,582.

(30) Foreign Application Priority Data

May 27, 2009 (GB) .................... 0908990.5
Jul. 11, 2009 (GB) .................... 0912051.0

(51) Int. Cl.
*G01D 5/353* (2006.01)
*G01M 11/00* (2006.01)
*G01F 1/66* (2006.01)

(52) U.S. Cl.
CPC ...... *G01D 5/35306* (2013.01); *G01D 5/35303* (2013.01); *G01D 5/35325* (2013.01);
(Continued)

(58) Field of Classification Search
CPC ................ G01D 5/35383; G01D 5/35303
See application file for complete search history.

(56) References Cited

U.S. PATENT DOCUMENTS 3,474,253 A 10/1969 Kessler
3,754,275 A 8/1973 Carter et al.
(Continued)

FOREIGN PATENT DOCUMENTS

CN 1412538 A 4/2003
CN 1841071 A 10/2006
(Continued)

OTHER PUBLICATIONS

Examination Report issued in corresponding GB Application No. 1120615.8 dated Feb. 11, 2014 (2 pages).
(Continued)

*Primary Examiner* — Kara E Geisel
*Assistant Examiner* — Dominic J Bologna
(74) *Attorney, Agent, or Firm* — Osha Liang LLP

(57) ABSTRACT

An interferometer apparatus for an optical fiber system and method of use is described. The interferometer comprises an optical coupler and optical fibers which define first and second optical paths. Light propagating in the first and second optical paths is reflected back to the optical coupler to generate an interference signal. First, second and third interference signal components are directed towards respective first, second and third photodetectors. The third photodetector is connected to the coupler via a non-reciprocal optical device and is configured to measure the intensity of the third interference signal component directed back towards the input fiber. Methods of use in applications to monitoring acoustic perturbations and a calibration method are described.

11 Claims, 9 Drawing Sheets

(52) U.S. Cl.
CPC ..... *G01D 5/35335* (2013.01); *G01D 5/35383* (2013.01); *G01F 1/661* (2013.01); *G01M 11/331* (2013.01)

(56) References Cited

U.S. PATENT DOCUMENTS

| | | |
|---|---|---|
| 4,138,659 A | 2/1979 | Johnson |
| 4,388,622 A | 6/1983 | Fletcher, Jr. |
| 4,428,236 A | 1/1984 | Votava et al. |
| 4,697,456 A | 10/1987 | Maser |
| 4,983,034 A | 1/1991 | Spillman, Jr. |
| 5,177,633 A | 1/1993 | Wong |
| 5,194,847 A | 3/1993 | Taylor et al. |
| 5,355,208 A | 10/1994 | Crawford et al. |
| 5,412,474 A | 5/1995 | Reasenberg et al. |
| 5,417,112 A | 5/1995 | Rosenberg |
| 5,521,704 A * | 5/1996 | Thiel ............ G01B 9/02004 356/486 |
| 5,596,410 A | 1/1997 | Hantel et al. |
| 5,754,293 A | 5/1998 | Farhadiroushan |
| 5,946,429 A | 8/1999 | Huang et al. |
| 6,079,875 A | 6/2000 | Klass et al. |
| 6,097,486 A | 8/2000 | Vakoc et al. |
| 6,105,430 A | 8/2000 | Kepler et al. |
| 6,195,162 B1 | 2/2001 | Varnham et al. |
| 6,212,003 B1 | 4/2001 | Komazawa et al. |
| 6,236,452 B1 | 5/2001 | Goto et al. |
| 6,426,496 B1 | 7/2002 | Froggatt et al. |
| 6,449,046 B1 | 9/2002 | Huang et al. |
| 6,466,706 B1 | 10/2002 | Go et al. |
| 6,522,797 B1 | 2/2003 | Siems et al. |
| 6,555,807 B2 | 4/2003 | Clayton et al. |
| 6,591,025 B1 | 7/2003 | Siems et al. |
| 6,687,008 B1 | 2/2004 | Peale et al. |
| 7,038,784 B2 | 5/2006 | Hall |
| 7,084,807 B2 | 8/2006 | Steinbuch et al. |
| 7,127,132 B1 | 10/2006 | Moslehi et al. |
| 7,339,678 B2 | 3/2008 | Hall et al. |
| 7,355,163 B2 | 4/2008 | Watley et al. |
| 7,488,929 B2 | 2/2009 | Townley-Smith et al. |
| 7,548,319 B2 | 6/2009 | Hartog |
| 7,946,341 B2 | 5/2011 | Hartog et al. |
| 2001/0030796 A1 | 10/2001 | Yao |
| 2002/0041722 A1 | 4/2002 | Johnson et al. |
| 2002/0064330 A1 | 5/2002 | Croteau et al. |
| 2002/0080450 A1 | 6/2002 | Hait |
| 2002/0131108 A1 | 9/2002 | Hait |
| 2002/0131111 A1 | 9/2002 | Hait |
| 2002/0181038 A1 | 12/2002 | Hait et al. |
| 2003/0038231 A1 | 2/2003 | Bryant et al. |
| 2003/0072051 A1 | 4/2003 | Myers et al. |
| 2003/0095262 A1 | 5/2003 | Blake |
| 2004/0065444 A1 | 4/2004 | Smith et al. |
| 2004/0239555 A1 | 12/2004 | Steinbuch et al. |
| 2005/0008322 A1 | 1/2005 | Sullivan et al. |
| 2005/0077455 A1 | 4/2005 | Townley-Smith et al. |
| 2005/0180263 A1 | 8/2005 | Lambert et al. |
| 2006/0018586 A1 | 1/2006 | Kishida |
| 2006/0101915 A1 | 5/2006 | Thompson et al. |
| 2006/0146337 A1 | 7/2006 | Hartog |
| 2006/0212231 A1 | 9/2006 | Bailey |
| 2006/0225507 A1 | 10/2006 | Paulson |
| 2006/0262889 A1 | 11/2006 | Kalvaitis et al. |
| 2007/0009007 A1 | 1/2007 | Nicholls et al. |
| 2007/0041020 A1 | 2/2007 | Hall |
| 2007/0145251 A1 | 6/2007 | Ogura et al. |
| 2008/0025146 A1 | 1/2008 | Welker |
| 2008/0144016 A1 | 6/2008 | Lewis et al. |
| 2008/0170742 A1 | 7/2008 | Trusov et al. |
| 2008/0277568 A1 | 11/2008 | Crickmore et al. |
| 2009/0015301 A1* | 1/2009 | Marchesini ............ H04N 5/335 327/141 |
| 2009/0114386 A1 | 5/2009 | Hartog et al. |
| 2009/0129785 A1 | 5/2009 | Murakami |
| 2009/0323734 A1 | 12/2009 | Drodofsky et al. |

FOREIGN PATENT DOCUMENTS

| | | |
|---|---|---|
| CN | 101297336 A | 10/2008 |
| DE | 3828943 A1 | 3/1990 |
| DE | 9318404 U1 | 2/1994 |
| DE | 19506180 C1 | 6/1996 |
| DE | 1338952 A1 | 3/2005 |
| EP | 1286133 A2 | 2/2003 |
| EP | 0944813 B1 | 10/2004 |
| EP | 1488482 A2 | 12/2004 |
| EP | 1615011 A1 | 1/2006 |
| EP | 1734223 A2 | 12/2006 |
| EP | 1853964 A1 | 11/2007 |
| EP | 1968165 A2 | 9/2008 |
| EP | 2029993 A2 | 3/2009 |
| EP | 2098842 A1 | 9/2009 |
| EP | 2362190 A1 | 8/2011 |
| EP | 2364226 A1 | 9/2011 |
| GB | 2145514 A | 3/1985 |
| GB | 2191909 A | 12/1987 |
| GB | 2197953 A | 6/1988 |
| GB | 2329960 A | 4/1999 |
| GB | 2354782 A | 4/2001 |
| GB | 2367890 A | 4/2002 |
| GB | 2396011 A | 6/2004 |
| GB | 2401738 A | 11/2004 |
| GB | 2408327 A | 5/2005 |
| GB | 2414543 A | 11/2005 |
| GB | 2442745 A | 4/2008 |
| GB | 2443661 A | 5/2008 |
| GB | 2445364 A | 7/2008 |
| GB | 2456300 A | 7/2009 |
| GB | 2462096 A | 1/2010 |
| GB | 2467177 A | 7/2010 |
| GB | 2469709 A | 10/2010 |
| JP | S5948664 A | 3/1984 |
| JP | H11237287 A | 8/1999 |
| JP | 2005-345137 A | 12/2005 |
| JP | 2007240287 A | 9/2007 |
| JP | 2009031040 A | 2/2009 |
| WO | 98/27406 A1 | 6/1998 |
| WO | 0246737 A2 | 6/2002 |
| WO | 03077381 A3 | 9/2003 |
| WO | 2004029671 A2 | 4/2004 |
| WO | 2004070346 A2 | 8/2004 |
| WO | 2004/102840 A1 | 11/2004 |
| WO | 2004102242 A1 | 11/2004 |
| WO | 2006048647 A2 | 5/2006 |
| WO | 2006092606 A1 | 9/2006 |
| WO | 2006/130499 A2 | 12/2006 |
| WO | 2007021287 A1 | 2/2007 |
| WO | 2007049004 A1 | 5/2007 |
| WO | 2007109127 A2 | 9/2007 |
| WO | 2007131794 A2 | 11/2007 |
| WO | 2008/056143 A1 | 5/2008 |
| WO | 2008060719 A2 | 5/2008 |
| WO | 2009056855 A1 | 5/2009 |
| WO | 2010009007 A1 | 1/2010 |
| WO | 2010020781 A1 | 2/2010 |
| WO | 2010065478 A1 | 6/2010 |
| WO | 2010091404 A1 | 8/2010 |
| WO | 2010116119 A2 | 10/2010 |
| WO | 2011058322 A2 | 5/2011 |

OTHER PUBLICATIONS

Examination Report issued in corresponding Australian Application No. 2010252746 dated Jul. 4, 2014 (3 pages).
Office Action issued in corresponding Chinese Application No. 201080032395.3 dated Mar. 17, 2014 (10 pages).
Shatalin, Sergey et al., "Interferometric optical time-domain reflectometry for distributed optical-fiber sensing", Applied Optics, vol. 37, No. 24, pp. 5600-5604, Aug. 20, 1998 (5 pages).
Combined Search and Examination Report issued in British Application No. GB1414505.6; Dated Sep. 29, 2014 (5 pages).
Combined Search and Examination Report issued in British Application No. GB1419009.4; Dated Nov. 28, 2014 (5 pages).

(56) References Cited

OTHER PUBLICATIONS

Search Report issued in British Application No. GB1419110.0; Dated Dec. 11, 2014 (1 page).
Search Report issued in British Application No. GB1419594.5; Dated Dec. 12, 2014 (1 page).
Search Report issued in British Application No. GB1421508.1; Dated Dec. 19, 2014 (1 page).
Combined Search and Examination Report issued in British Application No. GB1421510.7; Dated Jan. 20, 2015 (7 pages).
Combined Search and Examination Report issued in British Application No. GB1421509.9; Dated Jan. 26, 2015 (8 pages).
Combined Search and Examination Report issued in British Application No. GB1421507.3; Dated Jan. 27, 2015 (6 pages).
Combined Search and Examination Report issued in British Application No. GB1422080.0; Dated Jan. 29, 2015 (7 pages).
Combined Search and Examination Report issued in British Application No. GB1502005.0; Dated Feb. 16, 2015 (7 pages).
"Improved demodulation scheme for fiber optic interferometers using an asymmetric 3×3 coupler", Journal of lightwave technology, vol. 15, No. 11, Nov. 1997, Z. Zhao et al., pp. 2059-2068.
Combined Search and Examination Report issued in British Application No. GB1412510.8; Dated Aug. 7, 2014 (7 pages).
Combined Search and Examination Report issued in British Application No. GB1415258.1; Dated Oct. 20, 2014 (7 pages).
Combined Search and Examination Report issued in British Application No. GB1416571.6; Dated Oct. 22, 2014 (6 pages).
Combined Search and Examination Report issued in British Application No. GB1419107.6; Dated Nov. 28, 2014 (8 pages).
Combined Search and Examination Report issued in British Application No. GB1419112.6; Dated Nov. 28, 2014 (7 pages).
Combined Search and Examination Report issued in British Application No. GB1419116.7; Dated Dec. 2, 2014 (6 pages).
Combined Search and Examination Report issued in British Application No. GB1419120.9; Dated Nov. 28, 2014 (9 pages).
Examination Report issued in Australian Application No. 2010252747 dated Jun. 11, 2014 (3 pages).
Examination Report issued in Great Britain Application No. GB1120619.0 dated Mar. 14, 2014 (3 pages).
Office Action issued in Chinese Application No. 201080033359.9 with English translation dated Apr. 16, 2014 (14 pages).
Search and Examination Report issued in British Application No. GB1412510.8; Dated Sep. 11, 2014 (3 pages).
Search and Examination Report issued in British Application No. GB1412510.8; Dated Sep. 11, 2014 (4 pages).
Search and Examination Report issued in British Application No. GB1412510.8; Dated Sep. 11, 2014 (5 pages).
Search and Examination Report issued in British Application No. GB1412510.8; Dated Sep. 11, 2014 (6 pages).
Search and Examination Report issued in British Application No. GB1412510.8; Dated Sep. 15, 2014 (4 pages).
Kersey, et al, "Polarisation-insensitive fibre optic Michelson interferometer", Electronics Letters, IEEE Stevenage, GB, vol. 27, No. 6, Mar. 14, 1991, pp. 518-520.
Sun, et al, "General Analysis of 3X3 Optical-Fiber Directional Couplers", Microwave and Optical Technology Letters USA, vol. 2, No. 2, Feb. 1989, pp. 52-54.
Brown, et al., "A symmetric 3×3 coupler based demodulator for fiber optic interferometric sensors", Proceedings of the SPIE—The International Society for Optical Engineering USA, vol. 1584, Dec. 1991, pp. 328-335.
International Search Report for International App. No. PCT/GB2010/050889; Dated Aug. 30, 2011 (5 pages).
International Search Report for International App. No. PCT/GB2010/050888; Dated Sep. 13, 2011 (5 pages).
Office Action issued in U.S. Appl. No. 13/322,449; Dated Dec. 23, 2013 (24 pages).
Office Action issued in U.S. Appl. No. 13/322,449; Dated Jul. 3, 2014 (12 pages).
Office Action issued in U.S. Appl. No. 13/322,449; Dated Sep. 25, 2014 (18 pages).
Office Action issued in U.S. Appl. No. 13/322,448; Dated Aug. 30, 2013 (40 pages).
Office Action issued in U.S. Appl. No. 13/322,448; Dated Feb. 12, 2014 (29 pages).
Office Action issued in U.S. Appl. No. 13/322,448; Dated Oct. 21, 2014 (20 pages).
Examination Report issued in British Application No. GB1419116.7; Dated May 5, 2015 (5 pages).
Examination Report issued in British Application No. GB1419116.7; Dated May 21, 2015 (2 pages).
Examination Report issued in British Application No. GB1419594.5; Dated May 22, 2015 (4 pages).
Examination Report issued in British Application No. GB1419110.0; Dated Jun. 25, 2015 (4 pages).
Examination Report issued in British Application No. GB1419112.6; Dated Jun. 25, 2015 (3 pages).
Examination Report issued in British Application No. GB1421510.7; Dated Jun. 30, 2015 (4 pages).
Examination Report issued in British Application No. GB1422080.0; Dated Jun. 30, 2015 (9 pages).
Notice of Allowance issued in U.S. Appl. No. 13/322,448; Dated Jul. 2, 2015 (7 pages).
Notice of Allowance issued in U.S. Appl. No. 13/322,449; Dated Nov. 12, 2015 (7 pages).
Office Action issued in U.S Appl. No. 13/322,449; Dated Mar. 14, 2016 (11 pages).
Office Action issued in Canadian Application No. 2,763,389; Dated May 3, 2016 (4 pages).
Office Action issued in U.S. Appl. No. 13/322,449; Dated May 4, 2015 (10 pages).
Notice of allowance issued in U.S. Appl. No. 13/322,449; Dated Sep. 12, 2016 (7 pages).
Office Action issued in European Application No. 10737370.6; Dated Nov. 14, 2016 (5 pages).
Office Action issued in GCC Application No. GC 2010-17202; Dated Oct. 10, 2016 (6 pages).

* cited by examiner

OPTICAL SENSOR AND METHOD OF USE

CROSS-REFERENCE TO RELATED APPLICATIONS

This application is a continuation of U.S. application Ser. No. 13/322,448 filed on Mar. 12, 2012, which is a national stage application of PCT/GB2010/050888. Application PCT/GB2010/050888 was filed on May 27, 2010, and claims priority to GB Application 0912051.0, filed on Jul. 11, 2009, in the United Kingdom, and GB Application 0908990.5, filed on May 27, 2009, in the United Kingdom. These applications are incorporated by reference in their entireties.

FIELD OF THE DISCLOSURE

The present disclosure relates to optical sensors and, in particular, to an interferometer and methods of use.

BACKGROUND

The benefits of optical fibers have been demonstrated in a number of sensing applications. The two major areas are: (i) distributed optical fiber sensors, and (ii) multiplexed point sensor arrays.

Distributed sensors utilise the intensity of backscatter light, with Raman and/or Brillouin peaks in the light signal utilised to measure temperature, strain or pressure. Distributed sensors offer a number of advantages including continuous sensing along the entire length of fiber, and flexibility and simplicity of the sensor, which may be standard telecoms optical fiber. For example, a distributed sensor may provide 10,000 measurement points along 10 km of optical fiber with a 1 m spatial resolution. Distributed sensor systems therefore offer low installation and ownership costs.

However, due to their slow response, distributed sensors are usually only used in applications where measurements taking in order of several seconds to hours are acceptable. The most common sensors of this type are the distributed temperature sensors (DTS), which are made by a number of companies. A typical performance of a DTS is 1 m spatial resolution and 1° C. temperature resolution in 60 seconds over a 10 km range.

Distributed sensors have also been used to measure strain by utilising Brillouin shifts in reflected or backscattered light, as described in U.S. Pat. No. 6,555,807 (Clayton et al.) or WO 98/27406 (Farhadiroushan et al.) The frequency of the Brillouin shift is about 1 MHz/10µε and its linewidth is about 30 MHz. The strain in an order of 10µε can be determined along an optical fiber using the narrow frequency scanning methods described. However, using these approaches, the scanning rate is much slower than the pulse repetition rate and measurement times are typically in the order of few seconds to few minutes.

More recently, a technique for faster measurement of Brillouin frequency shift has been proposed in U.S. Pat. No. 7,355,163 (Watley et al.). This technique uses a frequency to amplitude convertor which may be in a form of an optical fiber Mach-Zehnder interferometer with a 3×3 coupler at its output. However, the strain resolution is limited by the linewidth of the Brillouin light and therefore the optical path length difference in the interferometer should be kept within the coherence length of the Brillouin light. Also, the polarisation fading between the two paths of the interferometer, the offset and gain variations of the photodetector receivers would significantly limit the strain measurement. Measurement times of around 0.1 seconds (10 Hz) with strain resolution of 50µε have been recently reported using this technique.

For many applications, such as acoustic sensing, much higher sensitivities and faster a measurement time in the order of 1 millisecond (1 kHz), 0.1 millisecond (10 kHz) or 0.01 millisecond (100 kHz) is required.

Multiplexed point sensors offer fast measurements with high sensitivity and are used, for example, in hydrophone arrays. The main application for these in the energy market is for towed and seafloor seismic arrays. However, unlike with distributed sensors, multiplexed point sensors cannot be used where full coverage is required. The size and the position of the sensing elements are fixed and the number of sensors multiplexed on a single fiber is typically limited to 50 to 100 elements. Furthermore, the sensor design relies on additional optical fiber components leading to bulky and expensive array architectures. There is also considerable effort to increase the number of sensors that can be efficiently multiplexed on a single length of fiber.

Optical-time-domain reflectometry (OTDR) is a well-known technique that has been used to test optical fiber communications cables. In order to reduce the effect of coherent backscatter interference, which is sometime is referred to as Coherent Rayleigh Noise, a broadband light source is normally used. However, proposals have also been made in U.S. Pat. No. 5,194,847 (Taylor et al.) to use coherent OTDR for sensing intrusion by detecting the fast changes in a coherent backscatter Rayleigh signal. In addition, Shatalin et al. (Shatalin et al. "Interferometric optical time-domain reflectometry for distributed optical-fiber sensing", Applied Optics, Vol. e7, No. 24, pp. 5600-5604, 20 Aug. 1998.) describes using coherent Rayleigh as a distributed optical fiber alarm sensor.

WO 2008/056143 (Shatalin et al.) describes a disturbance sensor similar to that of U.S. Pat. No. 5,194,847 (Taylor et al.) using a semiconductor distributed feedback laser source. A fiber Bragg grating filter of preferably 7.5 GHz is used to reject out-of-band chirped light and, thereby, improve the coherence of the laser pulse sent into the fiber. However, this requires matching of the laser wavelength with the narrow band optical filter, which results in the signal visibility variation being reduced compared to a system which uses a very high coherent source as proposed by U.S. Pat. No. 5,194,847.

Similar techniques have also been proposed for the detection of buried optical fiber telecommunication cables (for example in WO 2004/102840 (Russel et al.)), in perimeter security (GB 2445364 (Strong et al.) and US2009/0114386 (Hartog et al.)) and downhole vibration monitoring (WO 2009/056855 (Hartog et al.)). However, the response of these coherent Rayleigh backscatter systems has been limited by a number of parameters such as polarisation and signal fading phenomena; the random variation of the backscatter light; and non-linear coherent Rayleigh response. Therefore these techniques are mainly used for event detection and do not provide quantitative measurements, such as the measurement of acoustic amplitude, frequency and phase over a wide range of frequency and dynamic range.

SUMMARY OF INVENTION

The present disclosure provides novel apparatus and methods for fast quantitative measurement of perturbation of optical fields transmitted, reflected and or scattered along a length of an optical fiber.

Embodiments of the present disclosure can be used for distributed sensors, point sensors, or the combination of both.

In particular this technique can be applied to distributed sensors while extending dramatically the speed and sensitivity to allow the detection of acoustic perturbations anywhere along a length of an optical fiber while achieving fine spatial resolution. The present disclosure offers unique advantages in a broad range of acoustic sensing and imaging applications. Typical uses are for monitoring oil and gas wells, for applications such as for distributed flow metering and/or imaging; seismic imaging, monitoring long cables and pipelines; acoustic imaging inside large vessels as well as security applications.

Embodiments of the present disclosure provide apparatus for highly sensitive and fast quantitative measurement of the phase, frequency and amplitude of the light transmitted, reflected or scattered along a length of an optical fiber.

In the prior art, optical couplers have been used in Michelson or Mach-Zehnder interferometer configurations where the polarisation between the two arms of the interferometer has to be carefully controlled. The novel interferometer in the present disclosure allows an m×m coupler to be utilised using non-reciprocal devices, such as Faraday rotator mirrors and an optical circulator, to provide compensated light interference with a given phase shift that can be measured at all ports of the optical coupler and analysed very quickly, such as at several tens of kilohertz.

The embodiments of the disclosure can be used for multiplexed acoustic point sensors, distributed sensors or a combination of both. In the case of distributed sensors, light pulses are injected into the fiber and the phase modulation of the backscattered light is measured along the fiber at several tens of kilohertz. The fiber can be standard telecommunication fiber and/or cable. Using the techniques described herein, the sensing system can thereby detect the acoustic field along the fiber to provide a distributed acoustic sensor whereby the lengths of the sensing elements can be selected by a combination of adjusting the modulation of the light pulse, the path length in the interferometer as well as the sensing fiber configuration.

The data collected along the fiber are automatically synchronised and they may be combined to provide coherent field images.

According to a first aspect of the disclosure, there is provided interferometer apparatus for an optical fiber system, the apparatus comprising: an optical coupler having an input port and first and second ports coupled to optical fibers which define first and second optical paths; first and second reflectors arranged respectively in the first and second optical paths to reflect light propagating in the first and second optical paths back to the optical coupler to generate an interference signal; wherein the optical coupler is configured to direct first and second interference signal components respectively to first and second detector ports, and is configured to direct a third interference signal component towards the input port, and the apparatus comprises means for introducing a phase shift between the first, second and third interference signal components; first and second photodetectors connected to first and second detector ports of the optical coupler and configured to measure an intensity of first and second interference signal components at respective phase shifts; and wherein the apparatus comprises a third photodetector connected to the non-reciprocal optical device and configured to measure the intensity of the third interference signal component directed back towards the input fiber.

The means for introducing a phase shift between the first, second and third interference signal components may be the optical coupler, preferably an m×m optical coupler, where m>=3. The non-reciprocal optical device may be an optical circulator.

The optical fibers and reflectors may be configured to maintain polarisation or provide polarisation compensation for light propagating in the first and second optical paths. The reflectors may be Faraday Rotator Mirrors (FRMs), permitting the use of standard (non-polarisation maintaining) fibers.

The non-reciprocal optical device may be configured to receive the light signal and transmit it to the input port of the optical coupler.

This arrangement provides an economical configuration of components, which allow all ports of the optical coupler to be used effectively. The arrangement provides a "spare" port which may be used to cascade multiple interferometers together, or to couple to an additional detector or interferometer arm.

Other preferred and optional features of this aspect of the disclosure are defined by the claims. Furthermore, embodiments of this aspect of the disclosure may comprise preferred and optional features of other aspects of the disclosure.

According to a second aspect of the disclosure there is provided an interferometer system comprising a first interferometer apparatus as claimed in any preceding claim, and a second interferometer apparatus as claimed in any preceding claim, wherein a third output port of the optical coupler of the first interferometer apparatus is coupled to an input of the second interferometer apparatus.

The interferometer system may comprise multiple interferometer apparatuses, wherein respective output ports of a subset of the interferometer apparatuses are utilised as inputs for sequential interferometer apparatuses.

The different interferometer apparatuses may have different optical path length differences. This facilitates selection of different spatial resolutions in applications of the interferometer system.

Other preferred and optional features of this aspect of the disclosure are defined by the claims. Furthermore, embodiments of this aspect of the disclosure may comprise preferred and optional features of other aspects of the disclosure.

According to a third aspect of the disclosure there is provided an optical fiber system for monitoring an optical signal, the system comprising: a light source; an optical fiber deployed in an environment to be monitored and coupled to the light source; an interferometer apparatus as described in the first aspect and configured to receive backscattered or reflected light from the optical fiber; data capturing means for gathering data output from the photodetectors of the interferometer apparatus.

Other preferred and optional features of this aspect of the disclosure are defined by the claims. Furthermore, embodiments of this aspect of the disclosure may comprise preferred and optional features of other aspects of the disclosure.

According to a fourth aspect of the disclosure there is provided a method of monitoring acoustic perturbations, the method comprising: providing a light source, an optical fiber deployed in the environment to be monitored and coupled to the light source, and an interferometer configured to receive a pulsed optical signal from the optical fiber, the interferometer comprising at least two optical paths and at least two photodetectors; receiving backscattered or reflected light from the optical fiber in the interferometer, and generating an interference signal; introducing a phase shift between first and second interference signal components of the interference signal, and directing the first and second interference signal components to first and second photodetectors respectively; measuring the intensity of the first and second interference signal components at respective phase shifts to provide first intensity data and second intensity data; processing the first and second intensity data to determine the optical phase angle of the optical signal and provide optical phase angle data; processing the optical phase data to determine optical phase angle modulation data, and; identifying acoustic perturbations to which the optical fiber has been exposed from the optical phase angle modulation data.

The step of identifying acoustic perturbations to which the optical fiber has been exposed preferably comprises characterising the acoustic perturbations.

The method may comprise generating an acoustic output signal from the characterised acoustic perturbations.

Other preferred and optional features of this aspect of the disclosure are defined by the claims. Furthermore, embodiments of this aspect of the disclosure may comprise preferred and optional features of other aspects of the disclosure.

According to a fifth aspect of the disclosure there is provided a method of operating an interferometer in an optical system, the method comprising: providing an interferometer comprising an input configured to receive transmitted, reflected, or backscattered light from a first light source, at least first and second optical paths, and a plurality of photodetectors; providing an incoherent light source configured to input incoherent light to the interferometer; determining a normalisation factor for a photodetector offset, a relative photodetector gain, and/or a coupling ratio of the interferometer optical paths, by inputting light from an incoherent light source to the interferometer and measuring the outputs of the photodetectors.

Other preferred and optional features of this aspect of the disclosure are defined by the claims. Furthermore, embodiments of this aspect of the disclosure may comprise preferred and optional features of other aspects of the disclosure.

BRIEF DESCRIPTION OF DRAWINGS

Other preferred and optional features of this aspect of the disclosure are defined by the claims. Furthermore, embodiments of this aspect of the disclosure may comprise preferred and optional features of other aspects of the disclosure.

DETAILED DESCRIPTION

Figure 11:
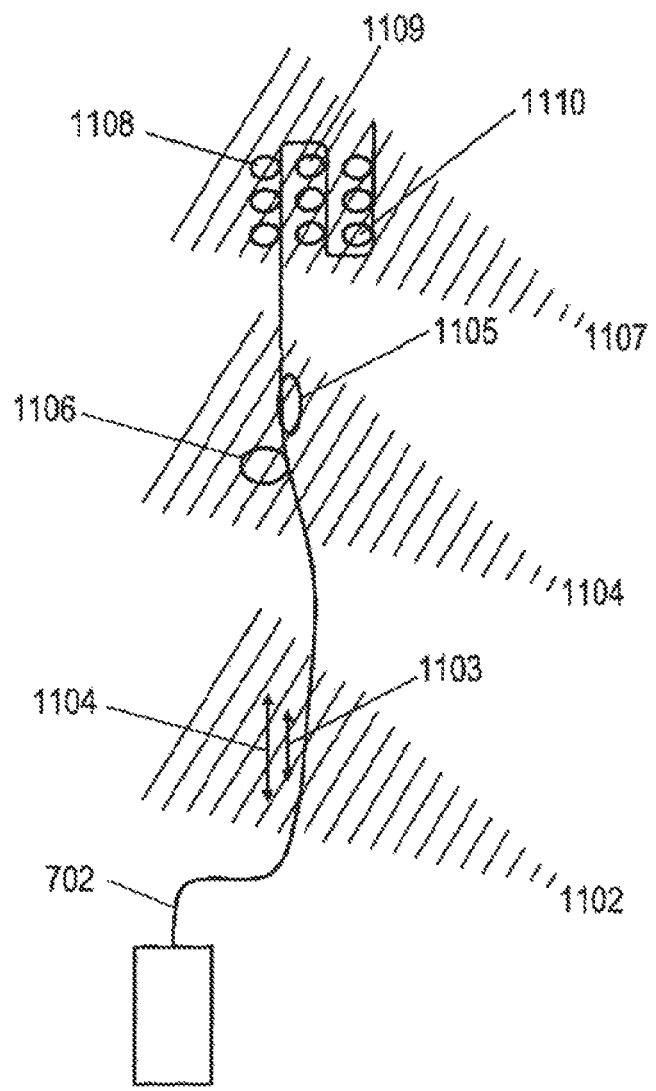
FIG. 11 shows schematically an embodiment in which the fiber can be deployed as linear sensors, directional sensors or in a multidimensional array of sensors.

FIG. 11 shows schematically an embodiment in which the fiber can be deployed as linear sensors, directional sensors or in a multidimensional array of sensors.

Figure 1:
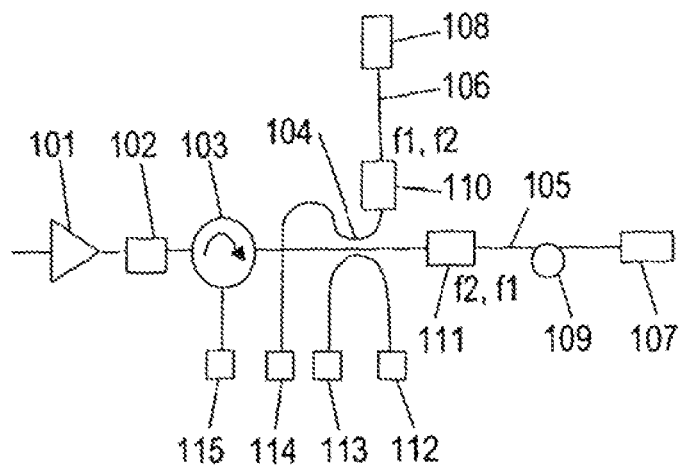
FIGS. 1, 2, 3 and 4 show schematically novel interferometer apparatus according to related embodiments of the disclosure, comprising circulators and multiple fiber couplers with different optical paths through the interferometers, Faraday-rotator mirrors and photodetectors.

FIG. 1 shows a first embodiment of a novel interferometer for measuring the optical amplitude, phase and frequency of an optical signal. The incoming light from a light source (not shown is preferably amplified in an optical amplifier 101, and transmitted to the optical filter 102. The filter 102 filters the out of band Amplified Spontaneous Emission noise (ASE) of the amplifier 101. The light then enters into an optical circulator 103 which is connected to a 3.times.3 optical coupler 104. A portion of the light is directed to the photodetector 112 to monitor the light intensity of the input light. The other portions of light are directed along first and second optical paths 105 and 106, with a path length difference between the two paths. Faraday-rotator mirrors (FRMs) 107 and 108 reflect the light back through the first and second paths 105 and 106, respectively. The Faraday rotator mirrors provide self-polarisation compensation along optical paths 105 and 106 such that the two portions of light efficiently interfere at each of the 3.times.3 coupler 104 ports. The optical couple 104 introduces relative phase shifts of 0 degrees, +120 degrees and −120 degrees to the interference signal, such that first, second and third interference signal components are produced, each at a different relative phase.

First and second interference signal components are directed by the optical coupler 104 to photodetectors 113 and 114, which measure the intensity of the respective interference signal components.

The circulator 103 provides an efficient path for the input light and the returning (third) interference signal component through the same port of the coupler 104. The interference signal component incident on the optical circulator 103 is directed towards photodetector 115 to measure the intensity of the interference signal component.

The outputs of the photodetectors 113, 114 and 115 are combined to measure the relative phase of the incoming light, as described in more detail below with reference to FIGS. 7 and 9.

Optionally, frequency shifters 110 and 111 and/or optical modulator 109 may be used along the paths 105 and 106 for heterodyne signal processing. In addition, the frequency shift of 110 and 111 may be alternated from f1, f2 to f2, f1 respectively to reduce any frequency-dependent effect between the two portions of the light propagating through optical paths 105 and 106.

The above-described embodiment provides a novel apparatus suitable for fast quantitative measurement of perturbation of optical fields, and in particular can be used for distributed and multiplexed sensors with high sensitivity and fast response times to meet requirements of applications such as acoustic sensing.

Figure 7:
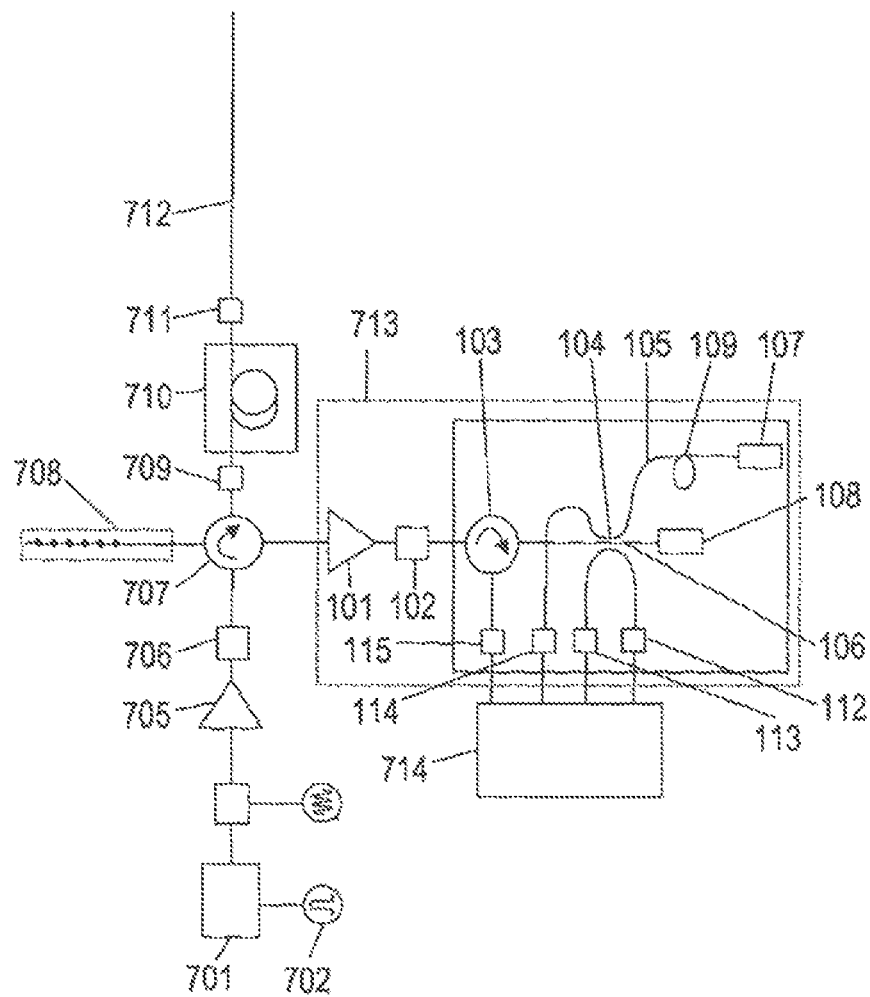
FIG. 7 shows schematically a sensor system that utilises the interferometer of an embodiment of the disclosure for fast measurement of scattered and reflected light from an optical fiber.

FIG. 7 shows an application of the interferometer of FIG. 1 to the distributed sensing of an optical signal from an optical system. It will be apparent that although the application is described in the context of distributed sensing, it could also be used for point sensing, for example by receiving reflected light from one or more point sensors coupled to the optical fiber.

In this embodiment, light emitted by a laser 701 is modulated by a pulse signal 702. An optical amplifier 705 is used to boost the pulsed laser light, and this is followed by a bandpass filter 706 to filter out the ASE noise of the amplifier. The optical signal is then sent to an optical circulator 707. An additional optical filter 708 may be used at one port of the circulator 707. The light is sent to sensing fiber 712, which is for example a single mode fiber or a multimode fiber deployed in an environment in which acoustic perturbations are desired to be monitored. A length of the fiber may be isolated and used as a reference section 710, for example in a "quiet" location or with a controlled reference signal. The reference section 710 may be formed between reflectors or a combination of beam splitters and reflectors 709 and 711.

The reflected and the backscattered light generated along the sensing fiber 712 is directed through the circulator 707 and into the interferometer 713. The detailed operation of the interferometer 713 is described earlier with reference to FIG. 1. In this case, the light is converted to electrical signals using fast low-noise photodetectors 112, 113, 114 and 115. The electrical signals are digitized and then the relative optical phase modulation along the reference fiber 710 and the sensing fiber 712 is computed using a fast processor unit 714 (as will be described below). The processor unit is time synchronized with the pulse signal 702. The path length difference between path 105 and path 106 defines the spatial resolution. The photodetector outputs may be digitized for multiple samples over a given spatial resolution. The multiple samples are combined to improve the signal visibility and sensitivity by a weighted averaging algorithm combining the photodetector outputs.

Data Processing

Figure 9:
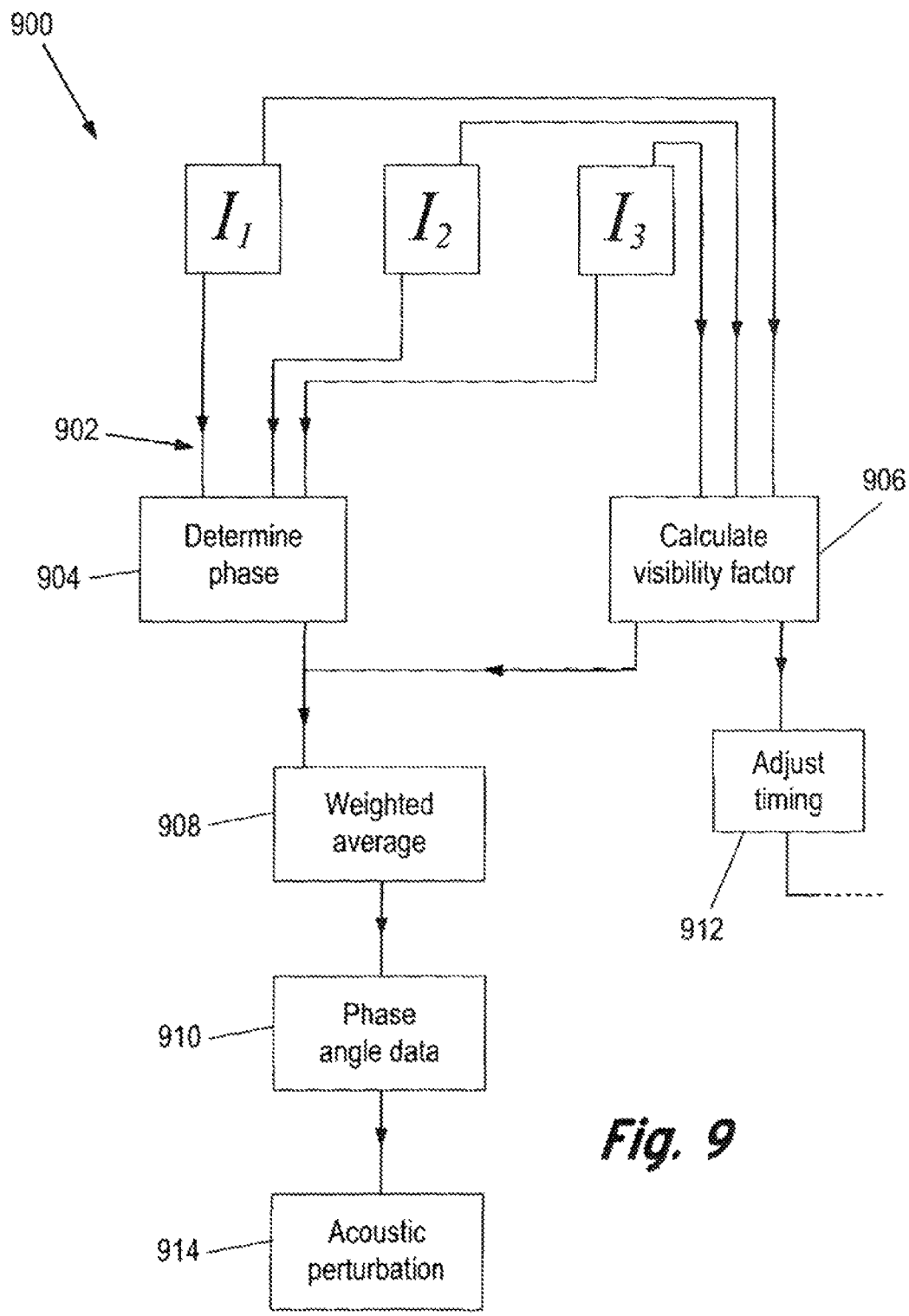
FIG. 9 is a block diagram representing a data processing method according to an embodiment of the disclosure.

FIG. 9 schematically represents a method 900 by which the optical phase angle is determined from the outputs of the photodetectors 113, 114, 115. The path length difference between path 105 and path 106 defines the spatial resolution of the system. The photodetector outputs may be digitized for multiple samples over a given spatial resolution, i.e. the intensity values are oversampled. The multiple samples are combined to improve the signal visibility and sensitivity by a weighted averaging algorithm combining the photo-detector outputs.

The three intensity measurements $I_1$, $I_2$, $I_3$, from the photodetectors 113, 114, 115 are combined at step 902 to calculate the relative phase and amplitude of the reflected or backscattered light from the sensing fiber. The relative phase is calculated (step 904) at each sampling point, and the method employs oversampling such that more data points are available than are needed for the required spatial resolution of the system. Methods for calculating the relative phase and amplitude from three phase shifted components of an interference signal are known from the literature. For example, Zhiqiang Zhao et al. (Zhao et al. "Improved Demodulation Scheme for Fiber Optic Interferometers Using an Asymmetric 3×3 Coupler", J Lightwave Technology, Vol. 13, No. 11, November 1997, pp. 2059-2068) and U.S. Pat. No. 5,946,429 (Huang et al.) describe techniques for demodulating the outputs of 3×3 couplers in continuous wave multiplexing applications. The described techniques can be applied to the time series data of the present embodiment.

For each sampling point, a visibility factor V is calculated at step 906 from the three intensity measurements $I_1$, $I_2$, $I_3$, from the photodetectors 113, 114, 115, according to equation (1), for each pulse.

$$V=(I_1-I_2)^2+(I_2-I_3)^2+(I_3-I_1)^2 \quad \text{Equation (1)}$$

At a point of low visibility, the intensity values at respective phase shifts are similar, and therefore the value of V is low. Characterizing the sampling point according the V allows a weighted average of the phase angle to be determined (step 908), weighted towards the sampling points with better visibility. This methodology improves the quality of the phase angle data 910.

Optionally, the visibility factor V may also be used to adjust (step 912) the timing of the digital sampling of the light for the maximum signal sensitivity positions. Such embodiments include a digitizer with dynamically varying clock cycles, (which may be referred to herein as "iclock"). The dynamically varying clock may be used to adjust the timing of the digitized samples at the photodetector outputs for the position of maximum signal sensitivity and or shifted away from positions with poorer visibility.

The phase angle data is sensitive to acoustic perturbations experienced by the sensing fiber. As the acoustic wave passes through the optical fiber, it causes the glass structure to contract and expand. This varies the optical path length between the backscattered light reflected from two locations in the fiber (i.e. the light propagating down the two paths in the interferometer), which is measured in the interferometer as a relative phase change. In this way, the optical phase angle data can be processed at 914 to measure the acoustic signal at the point at which the light is generated.

In preferred embodiments of the disclosure, the data processing method 900 is performed utilizing a dedicated processor such as a Field Programmable Gate Array.

Sensor Calibration

Figure 10:
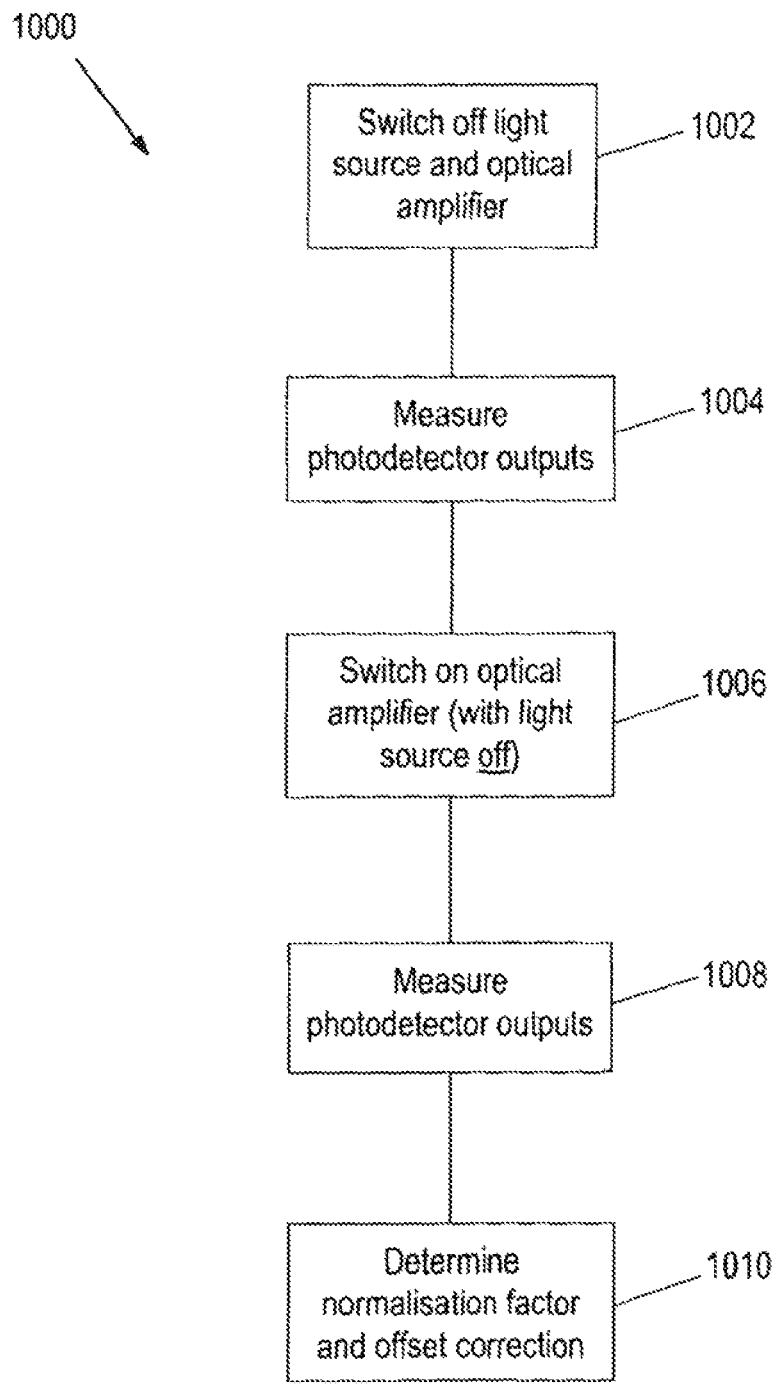
FIG. 10 is a block diagram representing a method of calibrating the interferometer according to an embodiment of the disclosure.

For accurate phase measurement, it is important to measure the offset signals and the relative gains of the photodetectors 113, 114 and 115. These can be measured and corrected for by method 1000, described with reference to FIG. 10.

Each photodetector has electrical offset of the photodetectors, i.e. the voltage output of the photodetector when no light is incident on the photodetector (which may be referred to as a "zero-light level" offset. As a first step (at 1002) switching off the incoming light from the optical fiber and the optical amplifier 101. When switched off, the optical amplifier 101 acts as an efficient attenuator, allowing no significant light to reach the photodetectors. The outputs of the photodetectors are measured (step 1004) in this condition to determine the electrical offset, which forms a base level for the calibration.

The relative gains of the photodetectors can be measured, at step 1008, after switching on the optical amplifier 101 while the input light is switched off (step 1006). The in-band spontaneous emission (i.e. the Amplified Spontaneous Emission which falls within the band of the bandpass filter 102), which behaves as an incoherent light source, can then be used to determine normalization and offset corrections (step 1010) to calibrate the combination of the coupling efficiency between the interferometer arms and the trans-impedance gains of the photodetectors 113, 114 and 115. This signal can also be used to measure the signal offset, which is caused by the in-band spontaneous emission.

Conveniently, the optical amplifier, which is a component of the interferometer, is used as an incoherent light source without a requirement for an auxiliary source. The incoherence of the source is necessary to avoid interference effects at the photodetectors, i.e. the coherence length of the light should be shorter than the optical path length of the interferometer. However, for accurate calibration it is preferable for the frequency band of the source to be close to, or centred around, the frequency of light from the light source. The bandpass filter 102 is therefore selected to filter out light with frequencies outside of the desired bandwidth from the Amplified Spontaneous Emission.

When used in a pulsed system, such as may be used in a distributed sensor, the above-described method can be used between optical pulses from the light source, to effectively calibrate the system during use, before each (or selected) pulses from the light source with substantively no interruption to the measurement process.

Figure 2:
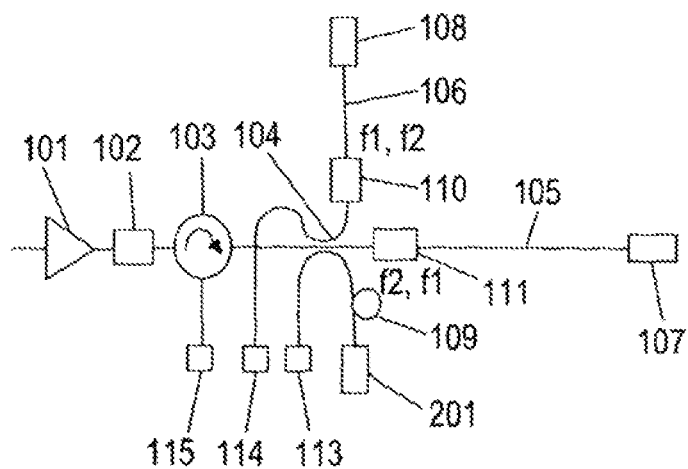

Variations to the above-described embodiments are within the scope of the disclosure, and some alternative embodiments are described below. FIG. 2 shows another embodiment of a novel interferometer similar to that shown in FIG. 1 but with an additional Faraday-rotator mirror 201 instead of photodetector 112. Like components are indicated by like reference numerals. In this case the interference between different paths, which may have different path length, can be separated at the three beat frequencies f.sub.1, f.sub.2 and (f.sub.2–f.sub.1). The arrangement of this embodiment has the advantage of providing additional flexibility in operation, for example the different heterodyne frequencies can provide different modes of operation to generate measurements at different spatial resolutions.

Figure 3:
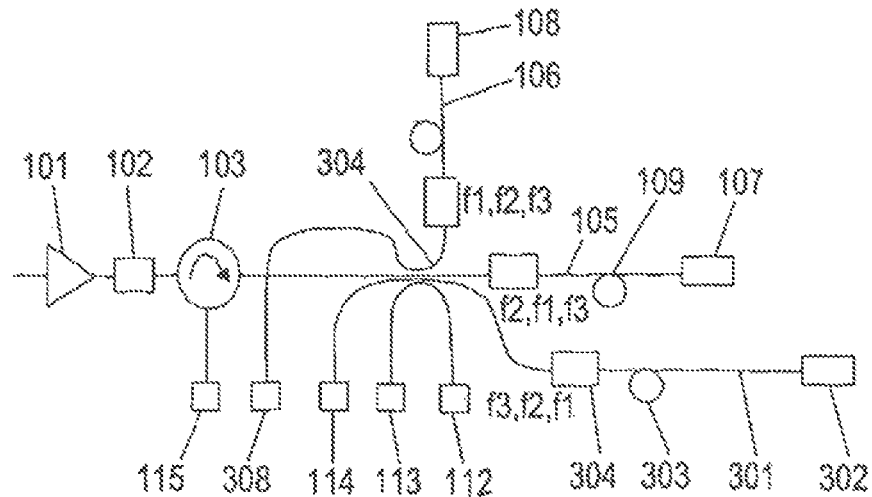

FIG. 3 shows another embodiment of a novel interferometer similar the arrangement of FIG. 1, with like components indicated by like reference numerals. However, this embodiment uses a 4×4 coupler and an additional optical path 301, frequency shifter 304, phase modulator 303. Faraday-rotator mirror 302 and additional photo-detector 308. In this case the interference between different paths, which may have different path length differences, can be separated at the three beat frequencies (f.sub.2–f.sub.1), (f.sub.3–f.sub.2) and (f.sub.3–f.sub.1.). Alternatively, the Faraday-rotator mirror 302 may be replaced by an isolator or a fiber matched end so that no light is reflected through path 301, so only allowing interference between path 105 and 106.

An m×m coupler that generates m interference signal components at different relative phase shifts may also be used in other embodiments of the disclosure.

Figure 4:
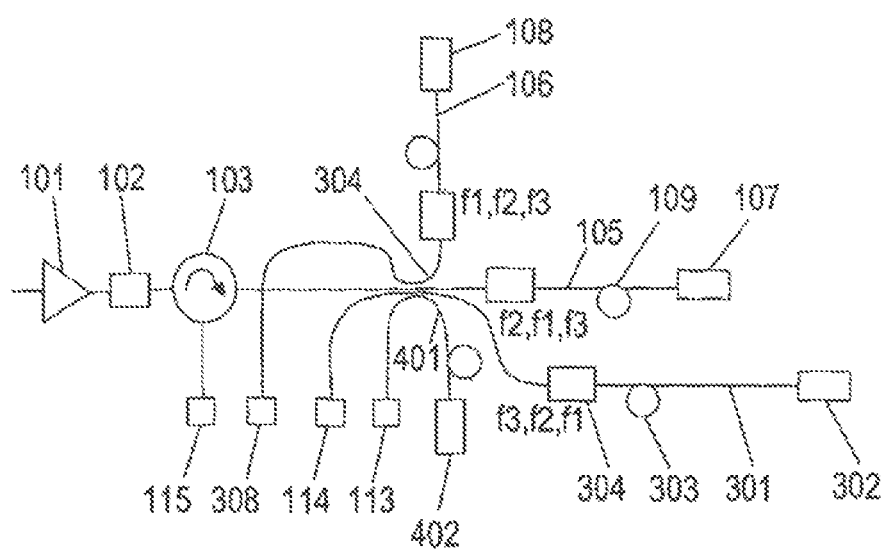

FIG. 4 shows another embodiment of the interferometer. In this case an additional path 401 is introduced in the interferometer by inserting a Faraday-rotator mirror 402 instead of the photo-detector 112.

In all of the above-described embodiments, optical switches may be used to change and/or select different combinations of optical path lengths through the interferometer. This facilitates switching between different spatial resolution measurements (corresponding to the selected path length differences in the optical path lengths).

Figure 5:
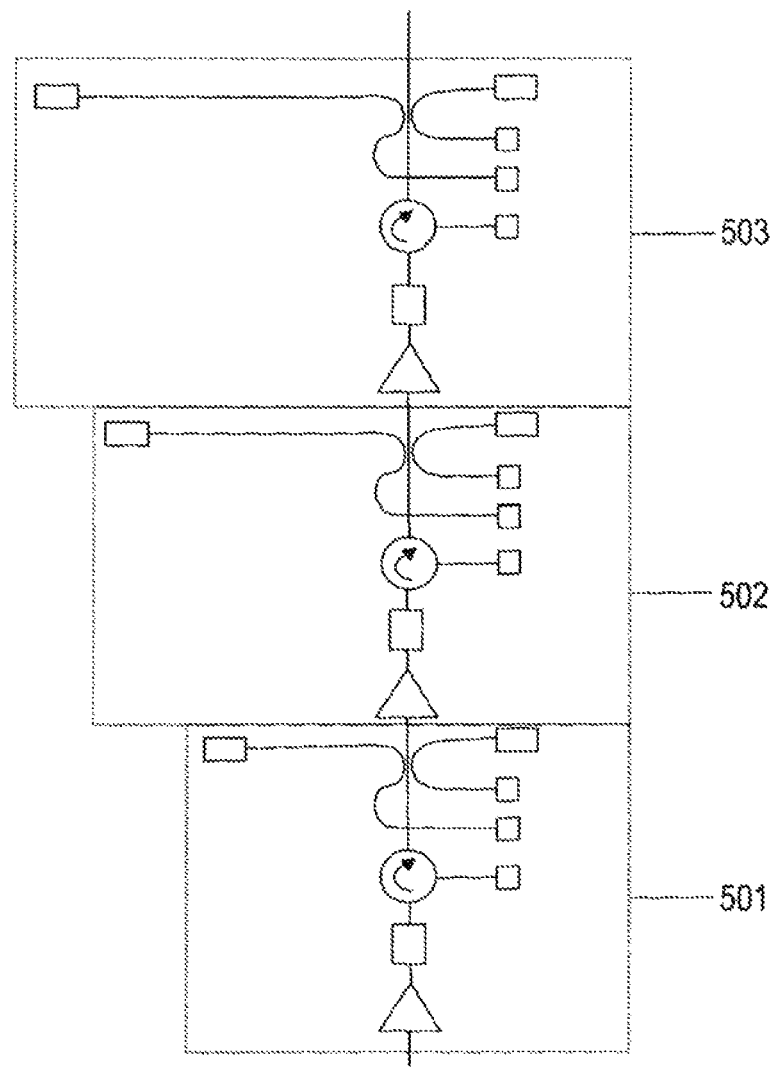
FIGS. 5 and 6 show schematically how the interferometers can be cascaded according to embodiments of the disclosure in series and/or star configurations.
Figure 6:
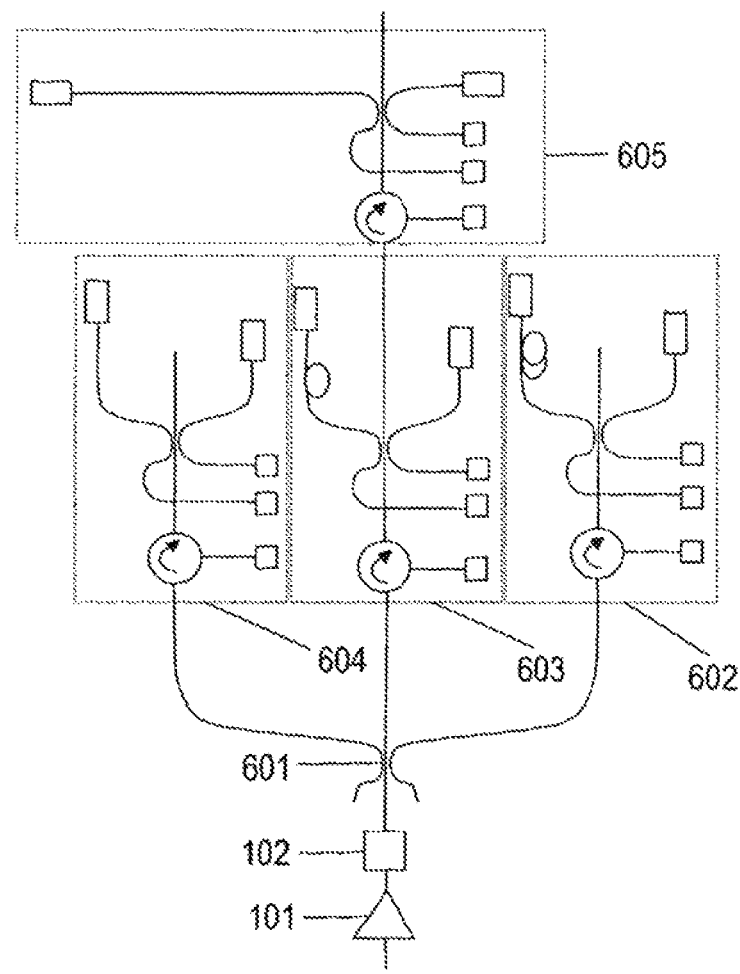

FIGS. 5 and 6 show examples of interferometer systems arranged for used in cascaded or star configurations to allow the measuring of the relative optical phase for different path length differences. In FIG. 5, three interferometers 501, 502, 503 having different path length differences and therefore different spatial resolutions) are combined in series. In FIG. 6, four interferometers 602, 603, 604 and 605 having different path length differences (and therefore different spatial resolutions) are combined with interferometers 602, 603, 604 in parallel, and interferometers 603 and 605 in series. In FIG. 6, 601 is a 3.times.3 coupler, used to split the light between the interferometers. The arrangement of FIG. 6 can also be combined with wavelength division multiplexing components to provide parallel outputs for different optical wavelengths.

FIG. 11 shows an embodiment with distributed sensors with the sensing fiber 702 subjected to different perturbation fields 1102, 1104 and 1107. The sensing fiber can be used as linear sensors 1103 and 1104, as directional sensors 1105 and 1106 or as multidimensional array sensors 1108, 1109 and 1110. Since all the measurements are synchronized, they can be processed to enhance the signal sensitivity, achieve a wide dynamic range and provide field imaging using beam forming techniques.

The embodiments described with reference to FIGS. 1 to 7 and 9 to 11 relate to apparatus and methods for fast quantitative measurement of acoustic perturbations of optical fields transmitted, reflected and or scattered along a length of an optical fiber. Embodiments of the disclosure in its various aspects can be applied or implemented in other ways, for example to monitor an optical signal generated by a laser, and/or to monitor the performance of a heterodyne signal generator, and to generate optical pulses for transmission into an optical signal. An example is described with reference to FIG. 8.

Figure 8:
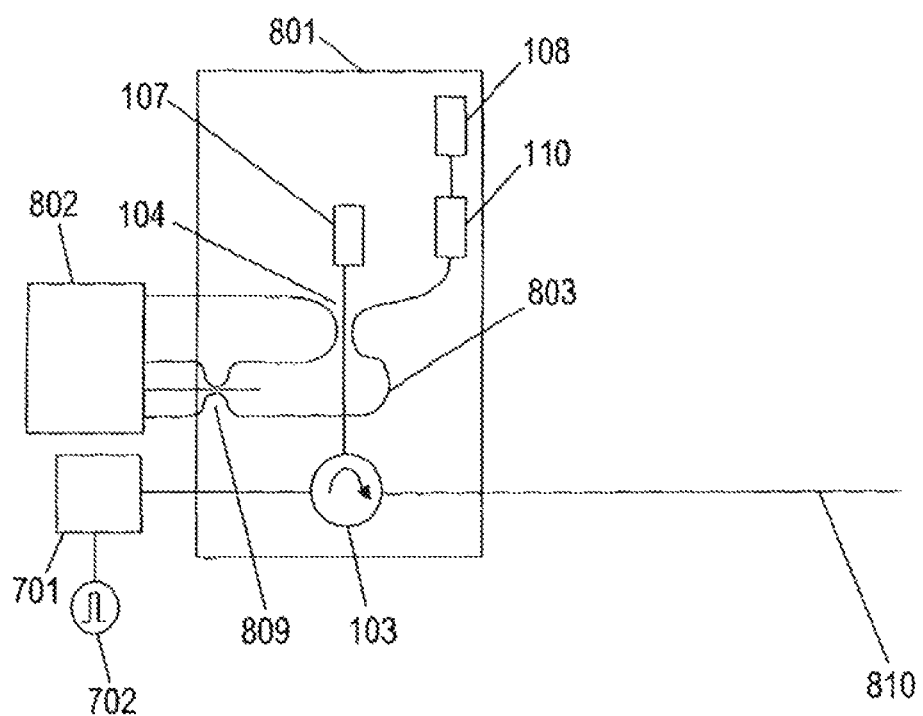
FIG. 8 shows schematically a distributed sensor system that utilises the interferometer of an embodiment of the disclosure to generate a series of pulses each of different frequency.

FIG. 8 shows a system comprising an interferometer 801 in accordance with an embodiment of the disclosure, used to generate two optical pulses with one frequency-shifted relative to the other. The interferometer receives an input pulse from a laser 701, via optical circulator 103. A 3.times.3 optical coupler 104 directs a component of the input pulse to a photodetector, and components to the arms of the interferometer. one of the arms includes a frequency shifter 110 and an RF signal. The interference between the two pulses is monitored by a demodulator 802. The light reflected by Faraday-rotator mirrors 107 and 108 is combined at the coupler 809 using a delay 803 to match the path length of the interferometer, so that the frequency shifted pulse and the input pulse are superimposed. The coupler 809 introduces relative phase shifts to the interference signal, and interferometer therefore monitors three heterodyne frequency signal components at relative phase shifts. The optical circulator 103 passes the two pulses into the sensing fiber 810.

Review of Features of the Disclosure in its Various Aspects and Embodiments

In one aspect, the disclosure provides an optical interferometer apparatus which can provide multiple path differences between the optical signals and provide interference signals between different optical paths with fixed and/or variable phase shifts. The interferometer utilizes beam splitting components, circulating devices and Faraday rotator mirrors in a novel configuration. The optical signals at the output of the interferometer are converted to electrical signals which digitized for fast processing. The offset levels of the electrical signals are removed and their amplitude are normalized. The relative phase shifts of optical signals are accurately determined by combining the normalized electrical signals.

In another aspect, the disclosure relates to an interferometer apparatus that utilizes beam splitters and non-reciprocal devices to provide light interference with given phase shifts and path length differences that can be measured at all ports of the beam splitters whereby the relative phase modulation of the light can be computed very accurately and quickly, such as at every few nanoseconds. The interferometer may use optical fiber components such as an m×m fused optical fiber coupler that is connected to an optical fiber circulator at one of its ports; Faraday-rotator mirrors that reflect and, at the same time, provide polarization compensation for the light propagating through the different paths of the interferometer and photodetectors that are used to measure the interference light signals. The incoming optical light may be amplified using an optical fiber amplifier, and preferably the interferometer has a pass band optical filter to filter out the out of band Amplified Spontaneous Emission noise (ASE). The interferometer may provide birefringence compensation for light propagating along different optical paths through the interferometer. This provides sufficiently high visibility at the outputs of the interferometer.

In another of its aspects, the disclosure provides a method for compensating the offset and the gain of the photodetectors, and the coupling ratio of the interferometer arms, to normalize the resultant interference signals used to measure the relative phase of the modulated input light in any of preceding claims where the detector offset is measured by switching off the optical amplifier in the backscatter path; the resultant photo-detector offset and gain then being determined by switching on the amplifier while the input light is switched off; the ASE of the optical amplifier then acts as an independent incoherent light source and thereby the offsets and relative gains of the photo-detectors can be determined and the detected light signals normalized. The method may therefore use incoherent light that enters the input of the interferometer to normalize the relative signal amplitudes at the output of the photo-detectors. For example, when an optical preamplifier is used at the input of the interferometer, the spontaneous light emission can be used to measure the combination of the splitting ratio of the interferometer arms and the relative gains of the photodetectors and thereby normalize the relative signal amplitudes accordingly.

Another additional feature of the present disclosure is to use phase modulators and/or frequency shifters to shift the relative frequency and or vary the phase between the optical paths of the interferometer. Frequency shifters and/or phase modulators may be used to provide heterodyne signals and/or to separate the resultant interference light signal from different paths through the interferometer.

An additional feature of an embodiment of the disclosure is selecting the frequency of the frequency shifter sufficiently high so that at least one cycle of the beat frequency results within one light pulse resolution. Different frequency shifts may be used between different optical paths of the interferometer for the separation and/or heterodyne detection of the phase between different optical paths. The frequency shifts between different optical paths may be alternated to correct for any frequency dependency of the interferometer output signals.

An additional feature of an embodiment of the disclosure is the selection of different optical paths through the interferometer such as by using optical switches. The optical switches may be used to select different optical paths through the interferometer and thereby select a different spatial resolution measurement. Another aspect of the disclosure relates to a system comprising a number of interferometers cascaded in a series or in a star configuration or a combination of both.

The disclosure also provides a system that utilizes a light pulse for multiplexed and/or distributed sensors by measuring the phase modulation of the reflected and/or the backscattered light along a length of fiber with high sensitivity, high dynamic range and a high speed of over tens of kilohertz. In this way, the disclosure can provide a multiplexed and/or distributed acoustic sensing system.

An additional feature of an embodiment of the disclosure is digitizing the outputs of the interferometer, or the photodetectors of the interferometer, at least twice over a spatial resolution interval. An additional feature of an embodiment of the disclosure is combining the outputs of the interferometer to determine the insensitive measurement sample points resulting from any signal fading of the light in order to reject and/or provide a weighted signal average of the multiple samples of the light over a given spatial resolution measurement or interval. Embodiments of the disclosure use a digitizer with dynamically varying clock cycles, (which may be referred to herein as "iclock"), to adjust the timing of the digital sampling of the light for the maximum signal sensitivity positions. The dynamically varying clock may be used to adjust the timing of the digitized samples at the photo-detector outputs for the position of maximum signal sensitivity and or shifted away where light signal fading occurs.

Embodiments of the disclosure may use a laser light or a broadband light source. Coherent matching of the light with the same delay results in an interference signal that can be used to measure the relative phase modulation of the scattered or reflected light along the fiber. Embodiments of the disclosure may use wavelength division multiplexed components to utilize multiple laser light pulses with different wavelengths and, preferably, varying time shift with respect to each to control the cross-phase modulation between the light pulses and to allow the processing of multiple pulses in the sensing fiber without and cross-sensitivity to allow the system to achieve a higher measurand frequency response. This may be the acoustic frequency response of the system to provide a different spatial sampling resolutions and/or positions, and/or to allow the efficient rejection of any points with low sensitivity.

An additional feature of an embodiment of the disclosure is the selection of different spatial resolutions whereby the sensitivity and the frequency response along the sensing fiber can be adjusted, and the dynamic range can be widened.

The sensing fiber may be single mode fiber, polarization maintaining fiber, a single polarization fiber, multimode fiber, and/or a ribbon fiber, and it may be coated and/or cabled to enhance or to suppress its sensitivity.

An additional feature of an embodiment of the disclosure is the selection of different configurations of the fiber to optimize the sensitivity, the frequency and the directionality of the sensing fiber at different locations. The fiber may be deployed as linear sensors, direction sensors or multidimensional array sensors. The fiber may be placed on a surface area in a continuous path without crossing over another part of the fiber to increase the sensitivity.

The fiber may be attached on a surface of a vessel to listen to the noise generated within the vessel to monitor the changes in the process, acoustically image the process, as well to detect any leaks.

A further aspect provides an apparatus using acoustic sensors for distributed flow measurement and imaging, in-well perforated zones monitoring and sand production monitoring. For example, for in-well applications, the acoustic noise profile can be used to measure the flow by noise logging at every location along the well. In addition, the noise spectrum can be used to identify the phase of the fluid. Further noise spectrum correlation techniques can be used over a long section of the well to determine the speed of sound as well as tracking eddies generated within the flow to accurately determine the flow rates.

The sensor systems may be used as a distributed acoustic sensor, enabling the determination of distributed flow measurement and imaging, perforated zones monitoring and sand production monitoring in oil and gas wells and flowlines. The distributed temperature and strain measurements may be combined to enhance the data interpretation of the distributed acoustic sensor.

Another aspect provides pipeline monitoring apparatus where the sensing fiber is deployed inside the pipeline and carried along the pipeline by the fluid drag to provide a measurement of the noise flow for diagnostics of the pipeline as well as for flow characterization and/or imaging.

Other advantages and applications of the disclosure will be apparent to those skilled in the art. Any of the additional or optional features can be combined together and combined with any of the aspects, as would be apparent to those skilled in the art.

As has been described above, apparatus and methods for fast quantitative measurement of perturbations of optical fields transmitted, reflected and/or scattered along a length of an optical fiber. In particular, embodiments of the disclosure can be used for distributed sensing while extending dramatically the speed and sensitivity to allow the detection of acoustic perturbations anywhere along a length of an optical fiber while achieving fine spatial resolution. Embodiments of the present disclosure offer unique advantages in a broad range of acoustic sensing and imaging applications. Typical uses are for monitoring oil and gas wells such as for distributed flow metering and/or imaging, monitoring long cables and pipelines, imaging of large vessels as well as security applications.

There follows a set of features describing particular embodiments of the disclosure. The features below may be considered in combination unless otherwise indicated.

An interferometer apparatus for an optical fibre system may comprise an optical coupler having an input port and first and second ports coupled to optical fibres which define first and second optical paths, first and second reflectors arranged respectively in the first and second optical paths to reflect light propagating in the first and second optical paths back to the optical coupler to generate an interference signal, wherein the optical coupler is configured to direct first and second interference signal components respectively to first and second detector ports, and is configured to direct a third interference signal component towards the input port, and the apparatus comprises means for introducing a phase shift between the first, second and third interference signal components. The apparatus also includes first and second photodetectors connected to first and second detector ports of the optical coupler and configured to measure an intensity of first and second interference signal components at respective phase shifts. The apparatus may further comprise a third photodetector connected to the non-reciprocal optical device and configured to measure the intensity of the third interference signal component directed back towards the input fibre.

The means for introducing a phase shift between the first, second and third interference signal components of the interferometer apparatus may be the optical coupler.

The optical coupler of the interferometer apparatus may be an m×m optical coupler, where m>=3.

The non-reciprocal optical device of the interferometer apparatus may be an optical circulator.

The optical fibres and reflectors of the interferometer apparatus may be configured to maintain polarisation or provide polarisation compensation for light propagating in the first and second optical paths. The reflectors of the interferometer apparatus may be Faraday Rotator Mirrors (FRMs).

The interferometer apparatus described above may further comprise an optical amplifier configured to receive an input light signal and output an amplified light signal to the optical coupler.

The interferometer apparatus described above may further comprise a band pass filter configured to filter out of band Amplified Spontaneous Emission noise (ASE) generated by the amplifier. According to some embodiments, the non-reciprocal optical device of the interferometer apparatus may be configured to receive the amplified light signal and transmit it to the input port of the optical coupler.

A third output port of the optical coupler of the interferometer apparatus described above may be connected to a fourth photodetector.

The interferometer apparatus as described above may further comprise a third output port of the optical coupler, wherein the third output port is coupled to an optical fibre defining a third optical path, and the apparatus comprises a third reflector arranged in the third optical path to reflect light propagating in the third optical path back to the optical coupler to generate an interference signal.

The interferometer apparatus as described above may further comprise a frequency shifter or optical modulator in at least one of the optical paths.

The interferometer apparatus as described above may further comprise a frequency shifter or optical modulator in the first and second optical paths.

The interferometer apparatus as described above may further comprise an optical switch configured to permit selection of different optical paths.

An interferometer system comprising a first interferometer apparatus as described above, and a second interferometer apparatus as described above, wherein a third output port of the optical coupler of the first interferometer apparatus is coupled to an input of the second interferometer apparatus.

The interferometer system may comprise multiple interferometer apparatuses, wherein respective output ports of a subset of the interferometer apparatuses are utilised as inputs for sequential interferometer apparatuses. According to some embodiments, the interferometer system may include the interferometer apparatuses cascaded in series and/or in a star configuration. The interferometer system with the interferometer apparatuses cascaded in series and/or in a star configuration may be configured such that different interferometer apparatuses have different optical path length differences.

An optical fibre system for monitoring an optical signal may comprise a light source, an optical fibre deployed in an environment to be monitored and coupled to the light source; an interferometer apparatus of any of features described above and configured to receive backscattered or reflected light from the optical fibre, and a data capturing means for gathering data output from the photodetectors of the interferometer apparatus.

The optical fibre system may further comprise data processing apparatus for processing the data output from the photodetectors to derive an acoustic signal.

The optical fibre system described above may be configured such that the optical fibre comprises a fibre selected from the group comprising: multimode fibre, single mode fibre, polarisation maintaining fibre, a single polarisation fibre, and/or a ribbon fibre.

The optical fibre system of any of features described above may be configured such that the optical fibre is coated and/or incorporated in a cable to enhance or suppress its sensitivity to acoustic perturbations.

The optical fibre system described above may be configured such that the environment to be monitored is subterranean. The environment to be monitored may also comprise a wellbore.

The optical fibre system described above may be configured such that the environment to be monitored comprises a pipeline.

The optical fibre system described above may be configured such that the optical fibre is deployed linearly. In another embodiment, the optical fibre system described above may be configured such that the optical fibre is deployed at least partially in a planar arrangement to provide directional sensing.

The optical fibre system described above may be configured such that the optical fibre is deployed in a multidimensional array.

The optical fibre system described above may be configured such that at least a part of the optical fibre is arranged on a surface area in a continuous path without crossing over another part of the fibre. According to such an embodiment, the optical fibre system may be configured such that at least a part of the optical fibre is arranged in a folded three-Omega ([Omega] [Omega] [Omega]) configuration. The optical fibre system of feature 29 or feature 30 wherein at least a part of the optical fibre is arranged in a double-eight (88) configuration.

A method of monitoring acoustic perturbations includes providing a light source, an optical fibre deployed in the environment to be monitored and coupled to the light source, and an interferometer configured to receive a pulsed optical signal from the optical fibre, the interferometer comprising at least two optical paths and at least three photodetectors. The method also includes receiving backscattered or reflected light from the optical fibre in the interferometer, and generating an interference signal and introducing a phase shift between first, second and third interference signal components of the interference signal, and directing the first, second and third interference signal components to first, second and third photodetectors respectively. The intensity of the first, second and third interference signal components are measured at respective phase shifts to provide first intensity data, second intensity data, and third. The method further includes processing the first, second and third intensity data to determine the optical phase angle of the optical signal to thereby provide optical phase angle data and optical phase angle modulation data and identifying acoustic perturbations to which the optical fibre has been exposed from the optical phase angle modulation data.

The step of identifying acoustic perturbations to which the optical fibre has been exposed may further comprise characterising the acoustic perturbations. The method may further comprise generating an acoustic output signal from the characterised acoustic perturbations.

The method described above may further comprise frequency shifting or phase modulating light propagating in the interferometer to provide a heterodyne signal. The method further comprising frequency shifting may include frequency shifting light propagating in the first optical path by a first frequency U and frequency shifting light propagating in the second optical path by a second frequency f2 during a first mode of operation; and frequency shifting light propagating in the first optical path by a frequency different from U and frequency shifting light propagating in the second optical path by a frequency different from f2 during a second mode of operation. In some embodiments, in the second mode of operation, the light propagating in the first optical path is frequency shifted by f2 and light propagating in the second optical path is frequency shifted by fi.

In some embodiments, the interferometer comprises a third optical path, and the method comprises frequency shifting or phase modulating light propagating in at least one of the optical paths to allow separation of the interference generated from a recombination of light from the respective different paths through the interferometer.

The method described above may further comprise frequency shifting or phase modulating light propagating in the interferometer to provide heterodyne signals from the first, second and third optical paths.

The method described above may further comprise frequency shifting light propagating in the interferometer by a frequency sufficiently high to produce a cycle of the heterodyne beat signal within a single pulse of the optical signal.

The method may further comprise selecting a spatial resolution interval at which optical phase angle data is desired, and oversampling the outputs of the photodetectors to provide multiple optical phase angle data over the spatial resolution interval. According to such a method, the outputs of the photodetectors may be sampled at least twice over the spatial resolution interval. The method may further comprise determining a visibility factor from the combined outputs of the photodetectors at each sampled point, and providing a weighted signal average of optical phase angle data from multiple sample points over the spatial resolution interval in dependence on the visibility factor. According to some embodiments, the method may further comprise adjusting the timing of the digitised samples of the photodetector outputs. According to some embodiments the method may further comprise determining a visibility factor from the combined outputs of the photodetectors at each sampled point; and adjusting the timing of the digitised samples of the photodetector outputs in dependence on the visibility factor. According to some embodiments, the visibility factor may be calculated by combining the squares of the differences of the intensity measurements from each photodetector.

The method described above may be configured such that the light source is a laser light or a broadband light source.

The method described above may further comprise determining a normalisation factor for a photodetector offset, a relative photodetector gain, and/or a coupling ratio of the interferometer optical paths, by inputting light from an incoherent light source to the interferometer and measuring the outputs of the photodetectors. According to such an embodiment, the method may further comprise filtering the light from the incoherent light source using a bandpass filter, such that the light input to the interferometer has a bandwidth around the frequency of light transmitted, reflected or backscattered light propagating through the fibre. According to the embodiments of this paragraph, the light input to the interferometer may have a coherence length shorter than the optical path length of the interferometer such that substantially no interference signal is detected.

The method including determining a normalisation factor for a photodetector offset, a relative photodetector gain, and/or a coupling ratio of the interferometer optical paths may further comprise determining an electrical photodetector offset for each of the photodetectors from the outputs of the photodetectors in a first condition, in which transmitted, reflected or backscattered light propagating through the fibre is decoupled from the interferometer and the incoherent light source is switched off so that no light signal is input to the interferometer; and determining a photodetector offset, a relative photodetector gain, and/or a coupling ratio of the interferometer optical paths from the outputs of the photodetectors in a second condition in which transmitted, reflected or backscattered light propagating through the fibre is decoupled from the interferometer and the incoherent light source is switched on to input light to the interferometer.

The method including determining a normalisation factor for a photodetector offset, a relative photodetector gain, and/or a coupling ratio of the interferometer optical paths may further comprise providing an optical amplifier configured to receive transmitted, reflected or backscattered light propagating through the fibre and output an amplified light signal to the interferometer; and utilising the Amplified Spontaneous Emission of the optical amplifier (ASE) as the incoherent light source. According to the embodiment described in this paragraph, the method may further comprise operating the interferometer in a third condition, in which the optical amplifier receives an input light signal from the light source and outputs an amplified light signal to the interferometer; and correcting for offsets and normalising the signals detected at the photodetectors using the determined normalisation factor. In some embodiments, the method may further comprise determining a normalisation factor and correcting for offsets and normalising the signals detected at the photodetectors between optical signal pulses.

A method of operating an interferometer in an optical system includes providing an interferometer comprising an input configured to receive transmitted, reflected, or backscattered light from a first light source, at least first and second optical paths, and a plurality of photodetectors; providing an incoherent light source configured to input incoherent light to the interferometer; determining a normalisation factor for a photodetector offset, a relative photodetector gain, and/or a coupling ratio of the interferometer optical paths, by inputting light from an incoherent light source to the interferometer and measuring the outputs of the photodetectors. This method may further comprise filtering the light from the incoherent light source using a bandpass filter, such that the light input to the interferometer has a bandwidth around the frequency of light from the first light source. In some embodiments, the light input to the interferometer has a coherence length shorter than the optical path length of the interferometer such that substantially no interference signal is detected.

The method of operating an interferometer in an optical system may further comprise determining an electrical photodetector offset for each of the photodetectors from the outputs of the photodetectors in a first condition, in which the first light source is decoupled from the interferometer and the incoherent light source is switched off so that no light signal is input to the interferometer; and determining a photodetector offset, a relative photodetector gain, and/or a coupling ratio of the interferometer optical paths from the outputs of the photodetectors in a second condition in which the first light source is decoupled from the interferometer and the incoherent light source is switched on to input light to the interferometer.

The method of operating an interferometer in an optical system may further comprise providing an optical amplifier configured to receive light from the first light source and output an amplified light signal to the interferometer, and utilising the Amplified Spontaneous Emission of the optical amplifier as the incoherent light source. The method according to embodiments of this paragraph may further comprise operating the interferometer in a third condition, in which the optical amplifier receives an input light signal from the first light source and outputs an amplified light signal to the interferometer; and correcting for offsets and normalising the signals detected at the photodetectors using the determined normalisation factor. The first light source is pulsed and the method may further include determining a normalisation factor and correcting for offsets and normalising the signals detected at the photodetectors between pulses. The first light source may comprise transmitted, reflected or backscattered light from an optical fibre.

What is claimed is:

1. An apparatus, comprising:
    a pulsed light source;
    an optical fibre deployed in an environment to be monitored and arranged to receive pulses of light from the pulsed light source;
    an interferometer arranged to receive light backscattered and/or reflected from along the length of the optical fibre as the pulses of light travel along the fibre and to generate an interference signal in dependence thereon, the light being backscattered and/or reflected in dependence on acoustic perturbations incident along the length of the optical fibre, and the interference signal comprising first, second, and third interference signal components having phase shifts therebetween;
    a first photodetector arranged to measure an intensity of the first interference signal component to provide first intensity data;
    a second photodetector arranged to measure an intensity of the second interference signal component to provide second intensity data;
    a third photodetector arrange to measure an intensity of the third interference signal component to provide third intensity data; and
    a processor time synchronised with the pulsed light source and arranged to:
        i) receive the first, second and third intensity data and to determine therefrom any optical phase modulation in the received light, and thereby obtain optical phase modulation data from along the length of the optical fibre; and
        ii) identify acoustic perturbations incident along the optical fibre in dependence on the determined optical phase modulation, wherein the optical phase modulation data obtained from along, the length of the optical fibre is synchronised to enhance signal sensitivity.

2. The apparatus of claim 1, wherein the interferometer further comprises a fourth photodetector arranged to monitor the intensity of the input light from the pulsed light source.

3. The apparatus of claim 1, comprising oversampling the outputs of the photodetectors to provide multiple optical phase angle data over a spatial resolution of the apparatus.

4. The apparatus of claim 3, wherein the outputs of the photodetectors are sampled at least twice over the spatial resolution.

5. The apparatus of claim 3, comprising:
    determining a visibility factor from the combined outputs of the photodetectors at each sampled point; and
    providing as weighted signal average, of optical phase angle data from multiple sample points over the spatial resolution of the apparatus in dependence on the visibility factor.

6. The apparatus of claim 5, comprising:
    determining a visibility factor from the combined outputs of the photodetectors at each sampled point; and
    adjusting the timing of the digitised samples of the photodetector outputs in dependence on the visibility factor.

7. The apparatus of claim 6, wherein the adjusting the timing of the digitised samples is performed by a digitiser with dynamically varying clock cycles.

8. The apparatus of claim 1, wherein the pulsed light source is a plurality of laser light pulses with a plurality of wavelengths.

9. The apparatus of claim 8, wherein the plurality of light pulses are time shifted with respect to each other to control the cross-phase modulation between the plurality of light pulses.

10. The apparatus of claim 1, further comprising calibration circuitry arranged to determine electrical offsets for the photodetectors during a first calibration condition in which no light propagates in the interferometer.

11. The apparatus of claim 1, further comprising calibration circuitry arranged to determine one or more of a photodetector offset, a relative photodetector gain, and/or a coupling ratio of optical paths in the interferometer from the outputs of the photodetectors during a calibration condition in which an incoherent light source inputs incoherent light to the interferometer.

* * * * *